(12) United States Patent
Ito et al.

(10) Patent No.: US 11,886,901 B2
(45) Date of Patent: *Jan. 30, 2024

(54) VM PERFORMANCE GUARANTEEING SYSTEM AND VM PERFORMANCE GUARANTEEING METHOD

(71) Applicant: Nippon Telegraph and Telephone Corporation, Tokyo (JP)

(72) Inventors: Yoshito Ito, Tokyo (JP); Makoto Hamada, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 787 days.

This patent is subject to a terminal disclaimer.

(21) Appl. No.: 16/977,892

(22) PCT Filed: Mar. 4, 2019

(86) PCT No.: PCT/JP2019/008279
§ 371 (c)(1),
(2) Date: Sep. 3, 2020

(87) PCT Pub. No.: WO2019/176606
PCT Pub. Date: Sep. 19, 2019

(65) Prior Publication Data
US 2021/0004255 A1    Jan. 7, 2021

(30) Foreign Application Priority Data
Mar. 12, 2018 (JP) .................................. 2018-044010

(51) Int. Cl.
*G06F 9/455* (2018.01)
*G06N 20/00* (2019.01)
(Continued)

(52) U.S. Cl.
CPC .......... *G06F 9/45558* (2013.01); *G06F 9/505* (2013.01); *G06F 9/5038* (2013.01);
(Continued)

(58) Field of Classification Search
CPC .... G06F 9/45558; G06F 9/5038; G06F 9/505; G06F 11/3409; G06F 2009/4557; G06F 2009/45579; G06N 20/00
See application file for complete search history.

(56) References Cited

U.S. PATENT DOCUMENTS

| 9,639,379 | B1* | 5/2017 | Suit | G06F 9/5016 |
| 2009/0198766 | A1* | 8/2009 | Chen | G06F 9/45558 718/1 |
| 2014/0196030 | A1* | 7/2014 | Deshpande | G06F 11/3442 718/1 |

OTHER PUBLICATIONS

W. Song, Z. Xiao, Q. Chen, and H. Luo, "Adaptive resource provisioning for the cloud using online bin packing," IEEE Trans. Comput., vol. 63, No. 11, pp. 2647-2660, Nov. 2014 (Year: 2014).*

(Continued)

*Primary Examiner* — Jacob D Dascomb
(74) *Attorney, Agent, or Firm* — Fish & Richardson P.C.

(57) ABSTRACT

In a virtual machine (VM) performance guarantee system, a physical server includes a storage unit that divides physical resources into a plurality of groups and stores priority group setting information containing priority groups for setting different numbers of VMs capable of sharing physical resources, and a priority group changing unit that receives an instruction for changing a priority group and changes a priority group to which a VM belongs, with reference to the priority group setting information. In addition, the controller includes a priority changing determination unit that determines insufficient performance and excessive performance for a calculated performance value on the basis of the resource use amount of the VM and performs the instruction for changing a priority group of the VM.

6 Claims, 7 Drawing Sheets

(51) Int. Cl.
  *G06F 9/50* (2006.01)
  *G06F 11/34* (2006.01)
(52) U.S. Cl.
  CPC ......... *G06F 11/3409* (2013.01); *G06N 20/00* (2019.01); *G06F 2009/4557* (2013.01); *G06F 2009/45579* (2013.01)

(56) References Cited

OTHER PUBLICATIONS

[No Author Listed], "The 15 Network Software Study Group—Network Software + General for Realization of Next Generation Network Service," Institute of Electronics, Jan. 18-19, 2018, 3 pages (with English Translation).
Access.redhat.com, [online], "Red Hat OpenStack Platform Instances and Images Guide," 2018, retrieved on Jan. 15, 2018, retrieved from URL<https://access.redhat.com/documentation/ja-jp/red_hat_openstack_platform/9/html/instances_and_images_guide/ch-cpu_pinning>, 90 pages (with English Translation).
Ito, "Prototype Implementation of VNF Performance Assurance System," National Telegraph and Telephone, Jan. 18, 2018, 48 pages (with English Translation).
Sueda, "The 15 Network Software Study Group Program," Lecture presented at Ishigaki Citer Chamber of Commerce and Industry, National Telegraph and Telephone, Jan. 18, 2018, 6 pages (with English Translation).

* cited by examiner

VM PERFORMANCE GUARANTEEING SYSTEM AND VM PERFORMANCE GUARANTEEING METHOD

CROSS-REFERENCE TO RELATED APPLICATIONS

This application is a National Stage application under 35 U.S.C. § 371 of International Application No. PCT/JP2019/008279, having an International Filing Date of Mar. 4, 2019, which claims priority to Japanese Application Serial No. 2018-044010, filed on Mar. 12, 2018. The disclosure of the prior application is considered part of the disclosure of this application, and is incorporated in its entirety into this application.

TECHNICAL FIELD

The present disclosure relates to a virtual machine (VM) performance guarantee system and a VM performance guarantee method for guaranteeing the performance of a VM which is shared on a physical machine using a network virtualization technique.

BACKGROUND ART

In a general virtualization environment in which a plurality of VMs are operated on a physical server, server resources are shared by all of the VMs. A sharing method is up to a scheduler of a hypervisor and a host operating system (OS) and cannot be controlled. Also in OpenStack, which is widely used as a virtualization environment, for example, a physical CPU (pCPU) is shared by all VMs on a physical server.

On the other hand, a technique for fixing (pinning) a VM to a dedicated physical CPU (CPU core) has been disclosed (NPL 1).

CITATION LIST

Non Patent Literature

NPL 1: "Setting of CPU pinning using NUMA node of section 4 in Red Hat OpenStack Platform instance & image guide", [online], Red Hat, [accessed Mar. 1, 2018]; Internet <URL: https://access.redhat.com/documentation/ja-jp/red_hat_openstack_platform/9/html/instances_and_images_guide/ch-cpu_pinning>

SUMMARY OF THE INVENTION

Technical Problem

In the related art as described above, the degree of sharing cannot be controlled with respect to which physical CPU operates a plurality of VMs on a physical server. For this reason, in a case where a service performance guarantee is required as a network function, resources are shared in an uncontrollable manner in particular when no control is performed in a virtualization environment including OpenStack, and thus a VM performance cannot be guaranteed.

In addition, when a technique for occupying resources and statically allocating VMs is used, a flexible configuration which is an inherent advantage of virtualization cannot be used, or resources cannot be effectively utilized.

An advantage of some aspects of the disclosure is to provide a VM performance guarantee system and a VM performance guarantee method capable of realizing performance guarantee of a VM while improving the efficiency of utilization of resources.

Means for Solving the Problem

In order to solve the problems described above, the invention according to a first aspect provides VM performance guarantee system including: a physical server that operates a plurality of virtual machines (VMs); and a controller that is connected to the physical server and manages an operation state of each VM, wherein the physical server includes a storage unit that divides physical resources in the physical server into a plurality of groups, sets a different number of VMs capable of sharing physical resources for each of the plurality of groups so that a priority group having a higher priority is set as the number of VMs capable of sharing physical resources decreases, and stores priority group setting information containing a correspondence relationship between each of the priority groups and the VM operated on physical resources of the priority group, a resource use amount collecting unit that collects a resource use amount during operation of each of the VMs, and transmits the resource use amount collected to the controller, and a priority group changing unit that changes a priority group to which a target VM belongs, with reference to priority group changing information when the priority group changing information indicating an instruction for changing the priority group with respect to each of the VMs is received from the controller, the controller includes a data acquisition unit that acquires a resource use amount of each of the VMs from the physical server, and a priority changing determination unit that determines whether or not a performance value calculated on the basis of the resource use amount acquired satisfies a first condition for determining insufficient performance of the target VM, determines whether or not the performance value satisfies a second condition for determining excessive performance of the target VM, transmits first priority group changing information indicating an instruction for performing change to a priority group having a higher priority to the physical server in a case where the performance value satisfies the first condition, and transmits second priority group changing information indicating an instruction for performing change to a priority group having a lower priority to the physical server in a case where the performance value satisfies the second condition, and the priority group changing unit of the physical server changes a priority group to which the target VM belongs to a priority group having a higher priority in a case where the first priority group changing information is received, and changes the priority group to which the target VM belongs to a priority group having a lower priority in a case where the second priority group changing information is received.

In addition, the invention according to a fourth aspect provides a VM performance guarantee method of a VM performance guarantee system including a physical server that operates a plurality of VMs, and a controller that is connected to the physical server and manages an operation state of each VM, the physical server including a storage unit that divides physical resources in the physical server into a plurality of groups, sets a different number of VMs capable of sharing physical resources for each of the plurality of groups so that a priority group having a higher priority is set as the number of VMs capable of sharing physical resources decreases, and stores priority group setting information containing a correspondence relationship between each of the priority groups and the VM operated on physical resources of the priority group, the VM performance guarantee method including: collecting, by the physical server, a resource use amount during operation of each of the VMs, and transmitting, by the physical server, the resource use amount collected to the controller; acquiring, by the controller, a resource use amount of each of the VMs from the physical server, determining, by the controller, whether or not a performance value calculated on the basis of the resource use amount acquired satisfies a first condition for determining insufficient performance of a target VM, determining, by the controller, whether or not the performance value satisfies a second condition for determining excessive performance of the target VM, transmitting, by the controller, first priority group changing information indicating an instruction for performing change to a priority group having a higher priority to the physical server in a case where the performance value satisfies the first condition, and transmitting, by the controller, second priority group changing information indicating an instruction for performing change to a priority group having a lower priority to the physical server in a case where the performance value satisfies the second condition, and changing, by the physical server, the priority group to which the target VM belongs to a priority group having a higher priority with reference to the priority group setting information in a case where the first priority group changing information is received, and changing, by the physical server, the priority group to which the target VM belongs to a priority group having a lower priority with reference to the priority group setting information in a case where the second priority group changing information is received.

In this manner, in the VM performance guarantee system, the physical resources are divided into a plurality of groups, and priority groups having different numbers of VMs capable of sharing the physical resources are defined. Further, in a case where the controller determines insufficient performance or excessive performance on the basis of the resource use amount of the VM, a priority group of the VM can be changed in the physical server. Thus, performance guarantee of the VM can be realized by efficiently utilizing the physical resources of the physical server.

In the invention of a second aspect according to the VM performance guarantee system of the first aspect, the controller further includes a test tool functioning unit that instructs each of the VMs belonging to the priority groups to execute a test tool to be operated by varying a load in a predetermined pattern, a learning functioning unit that receives a resource use amount and performance values obtained through the operation of the test tool as test result information from the physical server, and generates learning result data to be used to estimate a performance value based on the resource use amount by machine learning on the basis of the test result information, and a performance value estimating unit that calculates a performance estimation value of each of the VMs using the learning result data on the basis of a resource use amount of each of the VMs at a present time which is acquired from the physical server, and the priority changing determination unit determines whether to change the priority group of each of the VMs by determining whether or not the first condition is satisfied or whether or not the second condition is satisfied, using the calculated performance estimation values instead of the calculated performance values.

In this manner, the controller includes the test tool functioning unit, the learning functioning unit, and the performance value estimating unit, so that a performance estimation value of a VM can be calculated on the basis of the test result information obtained through the operation of the test tool even when a performance value cannot be calculated from the resource use amount of the VM obtained in real time. The controller determines insufficient performance or excessive performance using the performance estimation value, so that the VM can dynamically switch priority groups in the physical server. Thus, performance guarantee of the VM can be realized by efficiently utilizing the physical resources of the physical server.

In the invention of a third aspect according to the VM performance guarantee system of the first aspect, the data acquisition unit of the controller acquires a resource use amount and performance values of each of the VMs belonging to the priority groups from the physical server as actual data in operation for a predetermined period of time, the controller further includes a learning functioning unit that generates learning result data used to estimate a performance value based on the resource use amount by machine learning on the basis of the actual data, and a performance value estimating unit that calculates a performance estimation value of each of the VMs using the learning result data on the basis of a resource use amount of each of the VMs at a present time which is acquired from the physical server, and the priority changing determination unit determines whether to change the priority group of each of the VMs by determining whether or not the first condition is satisfied or whether or not the second condition is satisfied, using the calculated performance estimation values instead of the calculated performance values.

In this manner, the controller includes the learning functioning unit and the performance value estimating unit, so that a performance estimation value of the VM can be calculated on the basis of the actual data in the operation of the VM for a predetermined period of time. The controller determines insufficient performance or excessive performance using the performance estimation value, so that the VM can dynamically switch priority groups in the physical server. Thus, performance guarantee of the VM can be realized by efficiently utilizing the physical resources of the physical server.

Effects of the Invention

According to the present disclosure, it is possible to provide a VM performance guarantee system and a VM performance guarantee method for realizing performance guarantee of a VM while improving the efficiency of utilization of resources.

DESCRIPTION OF EMBODIMENTS

Hereinafter, an embodiment for implementing the present disclosure (hereinafter referred to as "the present embodiment") will be described. First, an outline of a characteristic configuration of a VM performance guarantee system S according to the present embodiment will be described.

Outline

Figure 6:
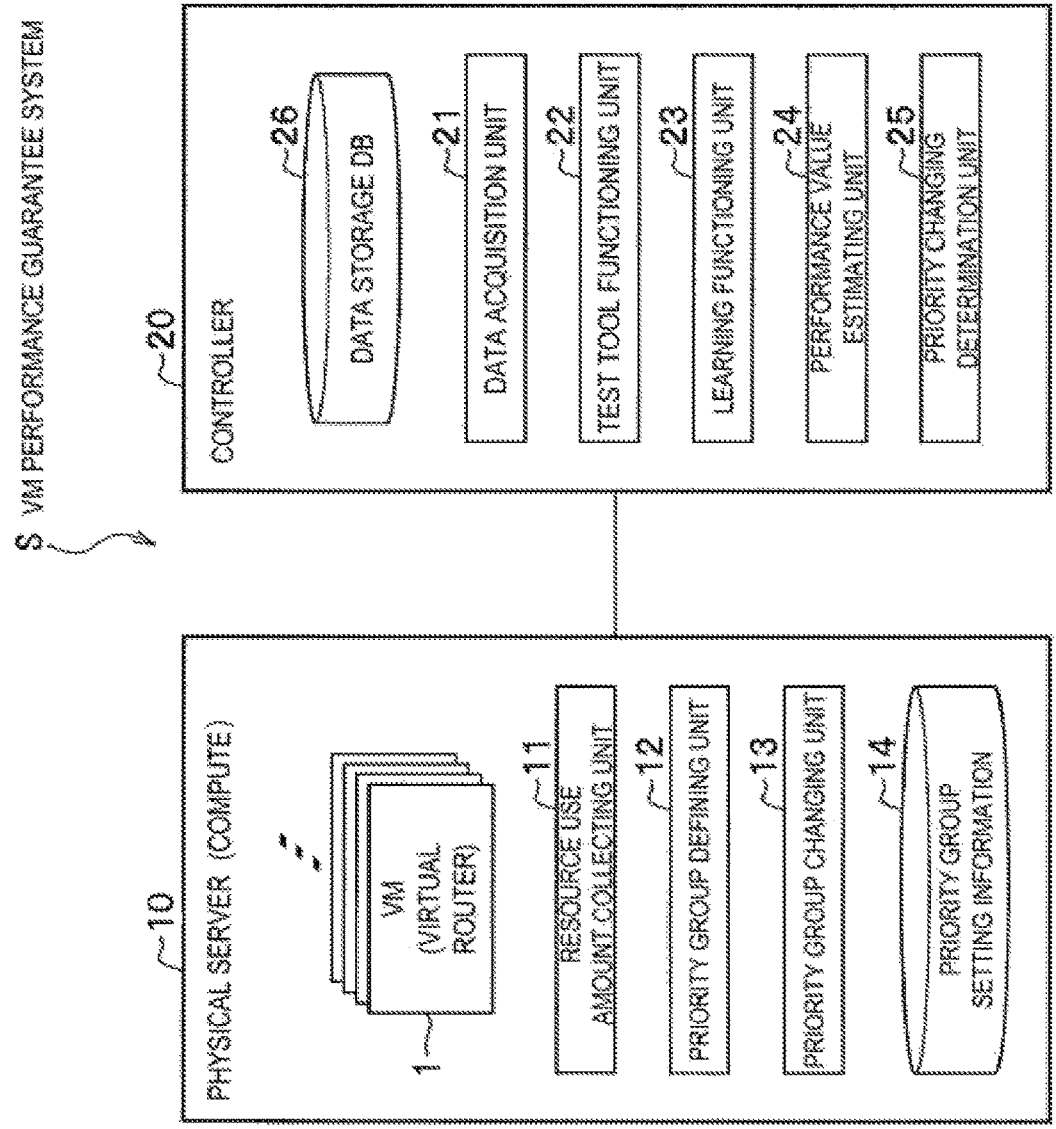
FIG. 6 is a diagram illustrating a configuration example of a physical server and a controller constituting the VM performance guarantee system according to the present embodiment.

The VM performance guarantee system S includes a physical server 10 (compute) including a plurality of VMs 1 and a controller 20, as illustrated in FIG. 6 to be described later. The VM performance guarantee system S has the following technical features in order to realize performance guarantee of the VM 1 while improving the utilization efficiency of the physical server 10.

Figure 1:
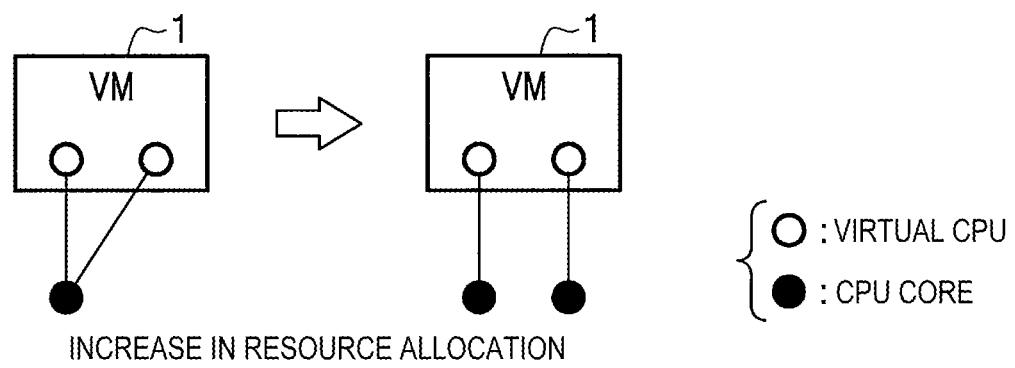
FIG. 1 is a diagram illustrating a method of the related art for increasing resource allocation in a case where the load of a VM has increased.

In the related art, as illustrated in FIG. 1, for example, assuming a situation where one physical resource (CPU core: a filled circle (a mark ●) in FIG. 1) includes one VM 1 (in FIG. 1, one VM 1 includes two virtual CPUs (a circle (a mark ○) in FIG. 1)), if the load of the VM 1 is increased, deterioration of the performance of the VM 1 is prevented by allocating more physical resources, that is, adding a CPU core to change the resource allocation amount to the VM 1. Specifically, in a case where the load of the VM 1 in the left drawing in FIG. 1 has increased, for example, the number of CPU cores is increased, and control of allocating one physical resource (CPU core) to one virtual CPU is performed as illustrated in the right drawing in FIG. 1.

Figure 2:
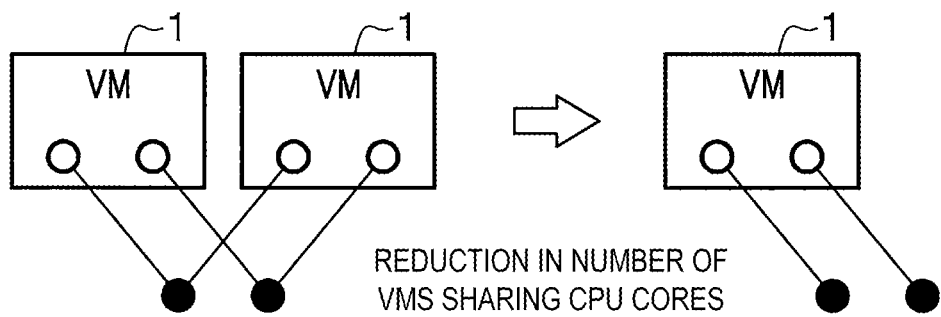
FIG. 2 is a diagram illustrating processing for changing the number of VMs to be shared in a VM performance guarantee system according to the present embodiment.

On the other hand, in the VM performance guarantee system S according to the present embodiment, as illustrated in FIG. 2, assuming a situation where two VMs 1 share two physical resources (CPU cores), if the load of the VMs 1 has increased, deterioration of the performance of the VMs 1 is prevented by changing the number of VMs to be allocated to the physical resources. In FIG. 2, control of changing the number of VMs 1 sharing physical resources from "2" to "1" is performed (see the right drawing in FIG. 2). That is, the number of VMs to be allocated is controlled with respect to finite physical resources (CPU cores) rather than changing the resource allocation amount to the VMs 1.

Figure 3:
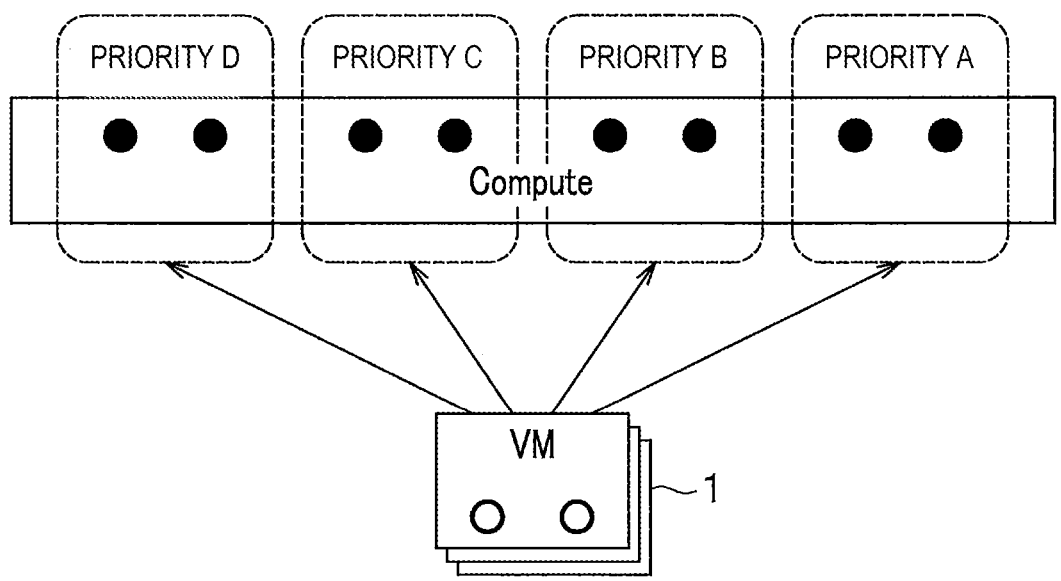
FIG. 3 is a diagram illustrating the division of resources into groups having different priorities in a physical server according to the present embodiment.

Further, in the physical server 10 of the VM performance guarantee system S, finite physical resources (CPU cores) are divided into several groups having different priorities (see FIG. 3). A priority group to which the VM 1 having insufficient performance belongs is changed so that the VM 1 belongs to a high priority group, on the basis of performance estimation values of the VMs 1 which are calculated from a resource use amount of the VMs 1. In addition, a priority group to which the VM 1 having excessive performance belongs is changed so that the VM 1 belongs to a low priority group. In this manner, the VM performance guarantee system S determines to which priority group the VM 1 belongs and changes a priority group to which the VM 1 belongs on the basis of performance estimation values calculated for the VMs 1.

In the present embodiment, a priority group is defined as a group identified according to the number of VMs 1 sharing physical resources (the number of VMs). Specifically, physical resources are divided into CPU pinning pattern groups having different overcommit ratios. A VM 1 dynamically switches priority groups (CPU pinning patterns) having different overcommit ratios in accordance with the load of the VMs 1. A CPU is occupied (fixed) with a pattern of a low overcommit ratio (high priority) in the case of a high load, and a CPU is occupied with a pattern of a high overcommit ratio (low priority) in the case of a low load. This can improve the efficiency of utilization of physical resources while guaranteeing performance having a predetermined value or more.

Figure 4:
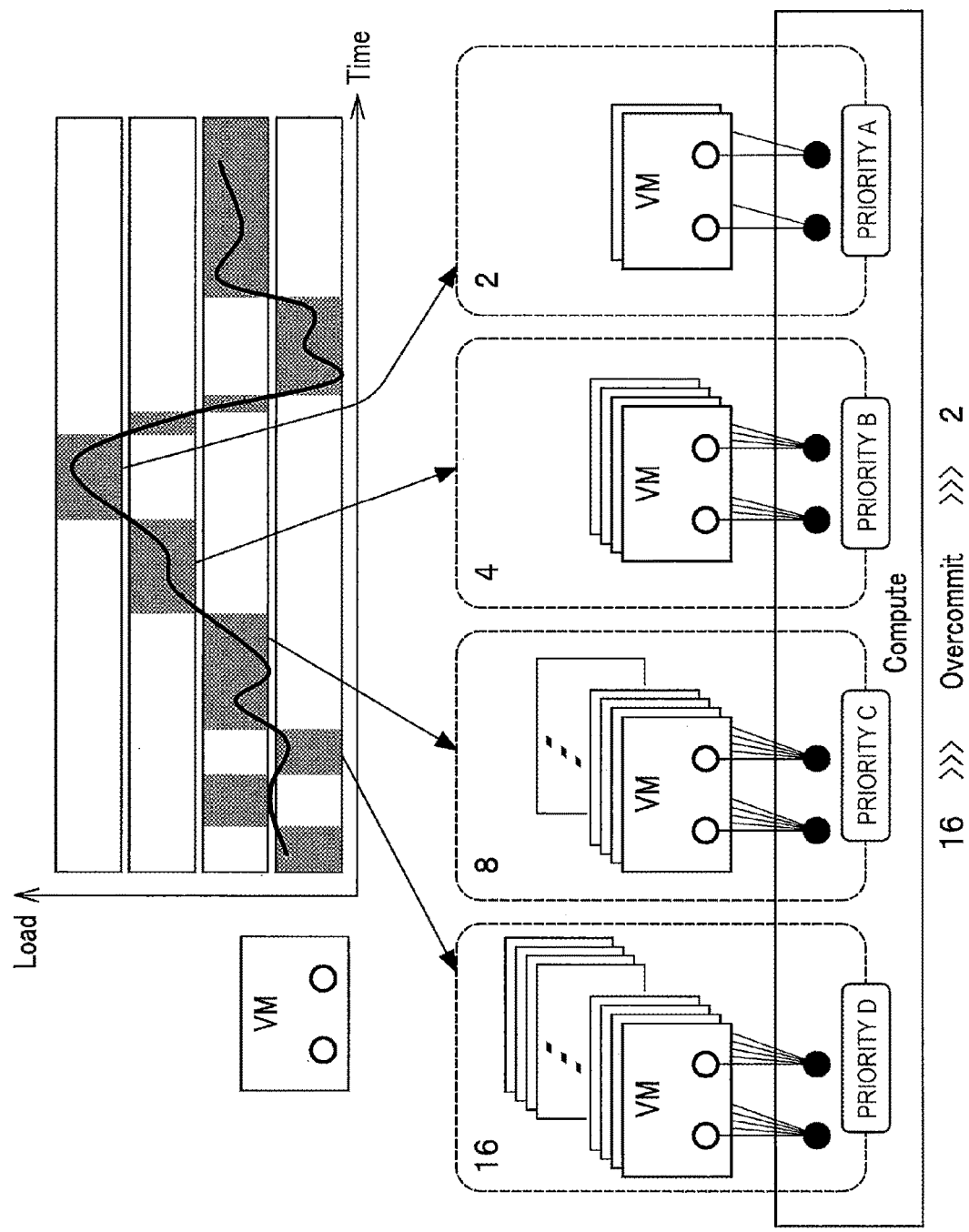
FIG. 4 is a diagram illustrating processing for changing a priority group according to the present embodiment.

For example, as illustrated in FIG. 4, a "group of priority A" is set as a highest priority group. The "group of priority A" is a pattern having a low overcommit ratio (high priority), which is set such that a unit (here, two CPU cores) of finite physical resources has "2" as the number of VMs, that is, can be shared by up to two VMs 1. The following "group of priority B" is a group in which a unit (two CPU cores) of finite physical resources can be shared by up to "4" VMs. The following "group of priority C" is a group in which a unit (two CPU cores) of finite physical resources can be shared by up to "8" VMs. A "group of priority D" is a pattern having a high overcommit ratio (low priority) which is set such that a unit (two CPU cores) of finite physical resources can be shared by up to "16" VMs.

Figure 5:
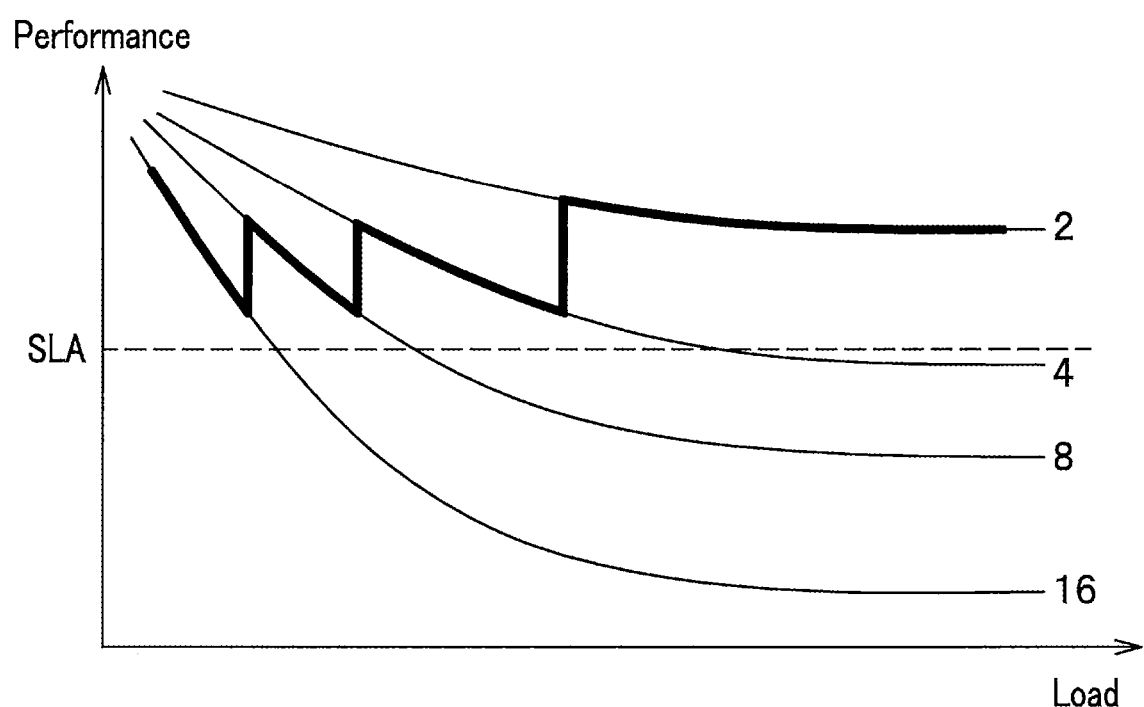
FIG. 5 is a diagram illustrating realization of performance guarantee of a VM by changing a priority group.

In the VM performance guarantee system S according to the present embodiment, for example, as illustrated in FIG. 5, first, in a case where the performance of the VM 1 belonging to the "group of priority D" having the number of VMs of "16" deteriorates and falls within a predetermined range with reference to a performance value indicated by a service level agreement (SLA), which is made in advance between the VM performance guarantee system and a user (in the case of an insufficient performance situation), a group to which the VM 1 belongs is changed to the "group of priority C" (the number of VMs capable of sharing physical resources is "8") having a low overcommit ratio with a higher priority. In a case where the performance of the VM 1 further deteriorates thereafter and falls within the predetermined range with reference to the performance value indicated by the SLA, the group to which the VM 1 belongs is similarly changed to a group having a low overcommit ratio with a higher priority such as the "group of priority B" (the number of VMs capable of sharing physical resources is "4") or the "group of priority A" (the number of VMs capable of sharing physical resources is "2"). In this manner, it is possible to realize performance guarantee of the VM 1.

Further, in the VM performance guarantee system S, in a case where there is a margin in performance (in the case of excessive performance), a group to which the VM 1 belongs is changed to a group having a high overcommit ratio with a lower priority. In this manner, it is possible to improve the efficiency of utilization of physical resources (CPU cores).

Configuration of the Present Embodiment

Next, the VM performance guarantee system S according to the present embodiment will be described.

FIG. 6 is a functional block diagram of the physical server 10 and the controller 20 constituting the VM performance guarantee system S according to the present embodiment.

The physical server 10 and the controller 20 are connected to each other through a communication network. In the present embodiment, description is given on the assumption that a plurality of VMs 1 functioning as virtual routers are disposed on one physical server 10. Note that the physical server 10 is not limited to a single physical server, and a plurality of physical servers 10 may be connected to the controller 20. In addition, the virtual router is also an example of the function of the VM 1, and other functions may be realized by the VM 1.

Physical Server

The physical server 10 has a function of setting a plurality of VMs 1 (virtual machines) on its own physical server (a function as a compute). Here, as a specific example of performance specified by an SLA or the like for each VM 1, latency of packet transfer of the VM 1 (virtual router) is used. Note that performance specified by an SLA or the like may be, for example, a throughput or the like, in addition to latency. In addition, a CPU use amount, a memory use amount, the number of packets transmitted or received, and the like of the VM 1 (virtual router) are used as a specific example of resource use amount.

The physical server 10 divides its own physical resources (for example, CPU cores) into a plurality of groups according to priorities, and a group among the groups having a different number of sharing VMs 1 (the number of VMs) is defined for each unit of the physical resources. The physical server 10 changes a priority group of the VM 1 to another priority group having a different overcommit ratio in accordance with the load of the VM 1.

The physical server 10 has a function of generating the VM 1 (not shown), and includes a resource use amount collecting unit 11, a priority group defining unit 12, and a priority group changing unit 13. In addition, the physical server 10 includes an input/output unit and a storage unit (neither of which is shown).

The input/output unit includes a communication interface for transmitting and receiving information, and an input/output interface for transmitting and receiving information to and from an input device such as a touch panel or a keyboard or an output device such as a monitor.

In addition, the storage unit is constituted by a flash memory, a hard disk, a random access memory (RAM), or the like. As illustrated in FIG. 6, the storage unit of the physical server 10 stores priority group setting information 14 (details will be described later).

The resource use amount collecting unit 11 collects a resource use amount (a CPU use amount, a memory use amount, the number of packets transmitted or received, and the like) of each VM 1. The resource use amount collecting unit 11 transmits information of the collected resource use amount for each VM 1 to the controller 20. Note that, in a case where a test tool to be described later is executed in response to an instruction of the controller 20, the resource use amount collecting unit 11 transmits the resource use amount of each VM 1, which is a test result of the test tool, to the controller 20.

The priority group defining unit 12 divides CPU cores which are physical resources of the physical server 10 into a plurality of groups. The groups are divided into CPU pinning patterns having different overcommit ratios and are set.

Specifically, as illustrated in FIG. 4, the priority group defining unit 12 sets a "group of priority A", in which the number of VMs capable of sharing physical resources is "2", as a group having the highest priority. A "group of priority B" in which the number of VMs capable of sharing physical resources is "4" is set as a group having the second highest priority. Further, a "group of priority C" in which the number of VMs capable of sharing physical resources is "8" is set as a group having the third highest priority. Further, a "group of priority D" in which the number of VMs capable of sharing physical resources is "16" is set as a group having the fourth highest priority (a group having the lowest priority).

Note that the priority groups are not limited to four groups of priorities A to D, and can be set to be any number of two or more groups within a range in which CPU cores can be divided.

In addition, a technique for fixing (pinning) the VM 1 to a dedicated CPU core can be realized by, for example, the technique of NPL 1.

The priority group defining unit 12 stores, in the storage unit, information of physical resources (CPU cores) corresponding to each priority group, the number of VMs sharing the physical resources (CPU cores) of the priority group (overcommit ratio), and information indicating to which priority group (the groups of priorities A to D) each of the VMs 1 belongs, as the priority group setting information 14.

The priority group changing unit 13 receives priority group changing information indicating an instruction for changing a priority group with respect to the VM 1 from the controller 20, and changes a priority group to which the VM 1 belongs to a group having a higher priority or a group having a lower priority indicated by the priority group changing information.

Controller

The controller 20 acquires information of a resource use amount of each VM 1 from the physical server 10 and calculates a performance estimation value of the VM 1 (virtual router). The controller 20 determines to which region, among an insufficient performance region, an unchanged region, and an excessive performance region, the calculated performance estimation value of the VM 1 belongs. In a case where the controller 20 determines that the performance estimation value of the VM 1 belongs to the insufficient performance region, the controller 20 transmits an instruction for changing the priority group to a priority group of a CPU pinning pattern having a lower overcommit ratio (priority group changing information) to the physical server 10. Further, in a case where the controller 20 determines that the performance estimation value of the VM 1 belongs to the excessive performance region, the controller 20 transmits an instruction for changing a priority group to a priority group of a CPU pinning pattern having a higher overcommit ratio (priority group changing information) to the physical server 10.

The controller 20 includes a data acquisition unit 21, a test tool functioning unit 22, a learning functioning unit 23, a performance value estimating unit 24, and a priority changing determination unit 25. In addition, the controller 20 includes an input/output unit and a storage unit (neither of which is shown).

The input/output unit includes a communication interface for transmitting and receiving information, and an input/output interface for transmitting and receiving information to and from an input device such as a touch panel or a keyboard or an output device such as a monitor.

In addition, the storage unit is constituted by a flash memory, a hard disk, a RAM, or the like. The storage unit of the controller 20 includes a data storage database (DB) 26, as illustrated in FIG. 6. The data storage DB 26 stores information of a resource use amount (a CPU use amount, a memory use amount, the number of packets transmitted or received, and the like) of each VM 1 which is acquired from the physical server 10. In addition, the data storage DB 26 stores information of test results for each VM 1 which is acquired from the physical server 10 in response to an instruction of the test tool functioning unit 22.

The data acquisition unit 21 acquires a resource use amount for each VM 1 which is collected by the physical server 10, and stores the acquired information in the data storage DB 26. In addition, the data acquisition unit 21 acquires test result information, such as collected resource use amount, as the result of a test tool executed by the physical server 10, and stores the acquired information in the data storage DB 26.

The test tool functioning unit 22 starts up a test tool and transmits a data acquisition start instruction to the physical server 10 to acquire data of a resource use amount for each VM 1 and the corresponding performance value (latency) from the physical server 10.

The test tool functioning unit 22 varies, for example, a load in a predetermined pattern with respect to each of the VMs 1 belonging to priority groups which are set at different overcommit ratios, and acquires a resource use amount obtained by the variation and performance values at that time as test result information.

Note that the reason for the use of the test tool is because data of the actual performance often cannot be acquired while a service is actually provided.

The learning functioning unit 23 performs analysis through machine learning (for example, regression analysis learning) using result data of the test tool (test result information) acquired by the test tool functioning unit 22 to generate learning result data. The learning result data is information for estimating performance values from the resource use amount for each VM 1 belonging to each overcommit ratio based group (priority group).

The performance value estimating unit 24 calculates performance estimation values of the respective VMs 1 using learning result data stored in the learning functioning unit 23 on the basis of the resource use amount of the VMs 1 acquired from the physical server 10 (at the present time).

The priority changing determination unit 25 determines to which region, among the insufficient performance region, the unchanged region, and the excessive performance region, the calculated performance estimation value of the VM 1 belongs, using the performance estimation values of the respective VMs 1 calculated by the performance value estimating unit 24.

For example, in a case where the priority changing determination unit 25 determines that the performance estimation value of the VM 1 belongs to the insufficient performance region, the priority changing determination unit 25 transmits an instruction for changing the priority group to a priority group of a CPU pinning pattern having a lower overcommit ratio (priority group changing information) to the physical server 10. Further, in a case where the priority changing determination unit 25 determines that the performance estimation value of the VM 1 belongs to the excessive performance region, the priority changing determination unit 25 transmits an instruction for changing the priority group to a priority group of a CPU pinning pattern having a higher overcommit ratio (priority group changing information) to the physical server 10. Note that, in a case where the priority changing determination unit 25 determines that the performance estimation value of the VM 1 belongs to the unchanged region, the priority changing determination unit 25 does not transmit an instruction for changing the priority group to the physical server 10. Thereby, the VM 1 continues to belong to the priority group to which it belongs at that time.

Flow of Processing

Figure 7:
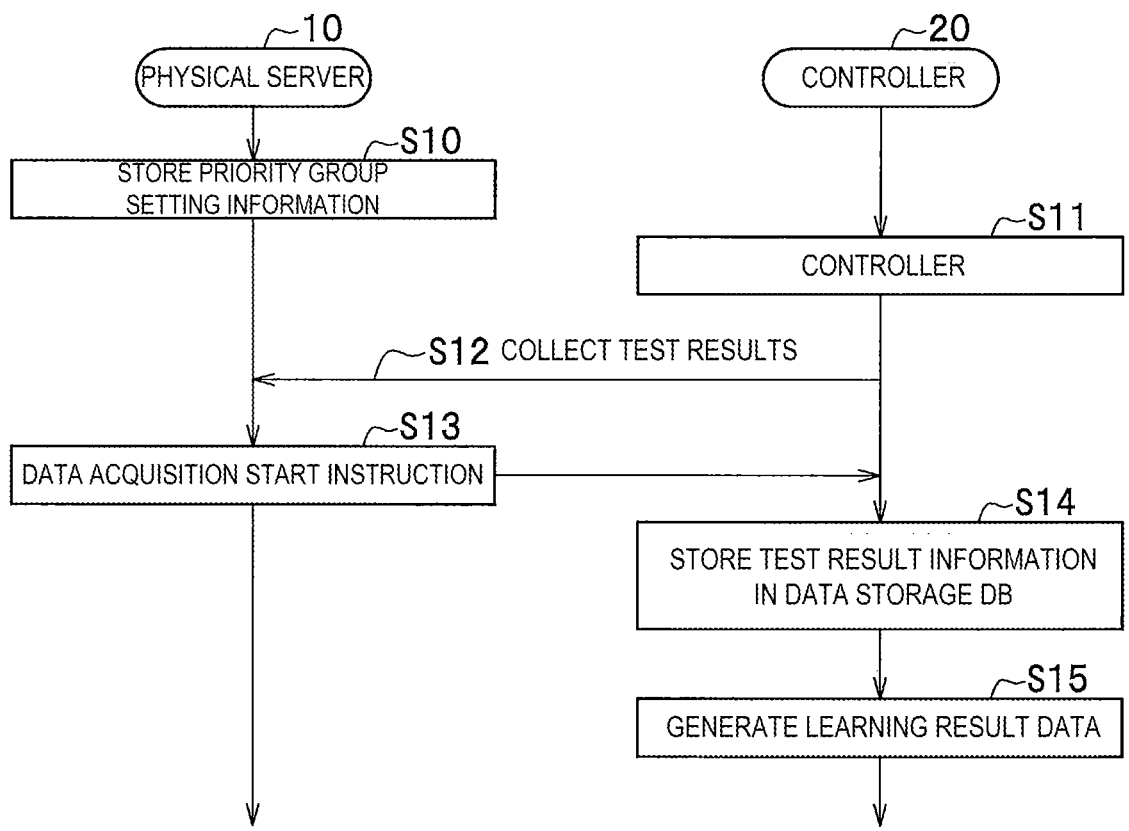
FIG. 7 is a flowchart illustrating a flow of a learning result data generation process executed by the VM performance guarantee system according to the present embodiment.

Next, a flow of processing executed by the VM performance guarantee system S will be described with reference to FIG. 7 and FIG. 8. In FIG. 7, processing for generating learning result data required to calculate an estimation latency value of the VM 1 (virtual router) (learning result data generation processing) will be described. Further, in FIG. 8, processing for changing a priority group of the VM 1 will be described.

FIG. 7 is a flowchart illustrating a flow of learning result data generation processing executed by the VM performance guarantee system S according to the present embodiment.

First, the priority group defining unit 12 of the physical server 10 stores information (overcommit ratio) of the number of VMs sharing physical resources (CPU cores) corresponding to each priority group and information indicating to which priority group (groups of priorities A to D) each of the VMs 1 belongs in the storage unit as the priority group setting information 14 (step S10).

In the priority group setting information 14, for example, as illustrated in FIG. 4, a "group of priority A" having the highest priority in which the number of VMs capable of sharing physical resources is set to "2", a "group of priority B" having the second highest priority in which the number of VMs capable of sharing physical resources is set to "4", a "group of priority C" having the third highest priority in which the number of VMs capable of sharing physical resources is set to "8", and a "group of priority D" having the lowest priority in which the number of VMs capable of sharing physical resources is set to "16" are set. In addition, initial setting information regarding to which priority group each of the VMs 1 on the physical server 10 belongs is stored in the priority group setting information 14.

Note that the priority group defining unit 12 may acquire the priority group setting information 14 from an external device (for example, the controller 20, a network management device, or the like), or may receive an input of information through an input/output unit (not shown).

Next, the test tool functioning unit 22 of the controller 20 starts up a test tool (step S11) and transmits a data acquisition start instruction to the physical server 10 (step S12).

When the data acquisition start instruction is received, the physical server 10 changes a load in a predetermined pattern, and the resource use amount collecting unit 11 collects the resource use amount for each VM 1 and information of performance values at that time as test results (step S13). The resource use amount collecting unit 11 transmits the collected test results to the controller 20.

The data acquisition unit 21 of the controller 20 receives test results and stores the received test results in the data storage DB 26 as test result information (step S14). Subsequently, the learning functioning unit 23 of the controller 20 performs analysis through machine learning (for example, regression analysis learning) using test result information for each VM 1 to generate learning result data (step S15).

In this manner, in the VM performance guarantee system S, learning result data is generated by previously measuring performance values based on a resource use amount for the VMs 1 in each priority group by using the test tool. The VM performance guarantee system S can calculate, by using the learning result data, performance estimation values on the basis of data of the resource use amount of the VMs 1 which is updated in real time.

Next, processing for changing a priority group of the VM 1 executed by the VM performance guarantee system S will be described.

Figure 8:
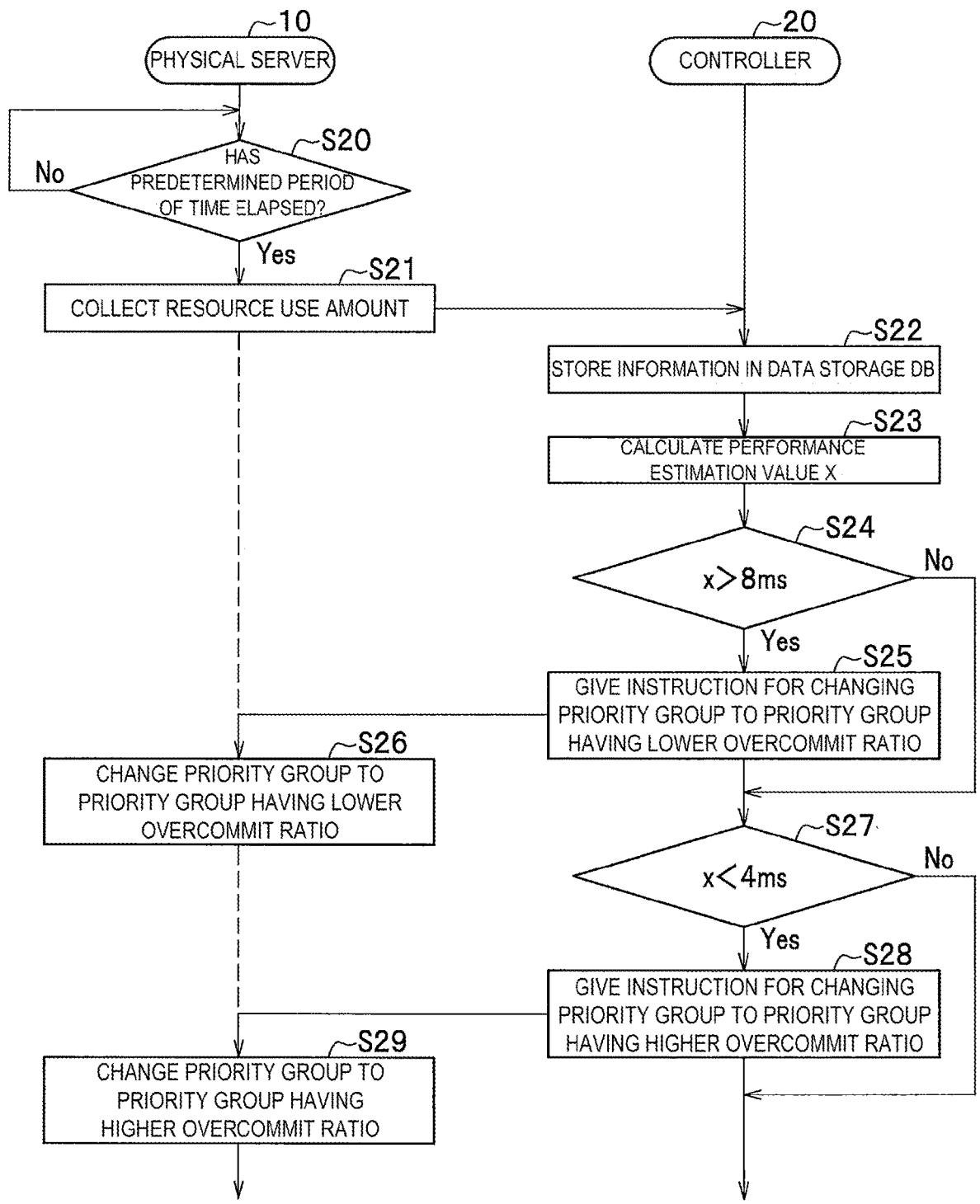
FIG. 8 is a flowchart illustrating a flow of a priority group changing process executed by the VM performance guarantee system according to the present embodiment.

FIG. 8 is a flowchart illustrating a flow of priority group changing processing executed by the VM performance guarantee system S according to the present embodiment.

Here, the resource use amount collecting unit 11 of the physical server 10 collects a resource use amount for each VM 1 at predetermined time intervals and transmits the collected resource use amounts to the controller 20. The performance value estimating unit 24 of the controller 20 calculates a performance estimation value of the VM 1 using learning result data. With respect to the calculated performance estimation value, the priority changing determination unit 25 determines whether or not the performance estimation value belongs to an insufficient performance region or whether or not the performance estimation value belongs to an excessive performance region. Hereinafter, description will be given in detail.

Note that it is assumed that the storage of the priority group setting information 14 by the physical server 10 and the generation of learning result data by the controller 20, which are performed in FIG. 7, are completed before the processing in FIG. 8.

First, the resource use amount collecting unit 11 of the physical server 10 determines whether or not a predetermined period of time has elapsed (step S20). In a case where a predetermined period of time has not elapsed (step S20→No), the processing returns to step S20 and the elapse of a predetermined period of time is awaited. On the other hand, in a case where the predetermined period of time has elapsed (step S20→Yes), the processing proceeds to the next step S21. That is, the subsequent processing is repeatedly performed at predetermined time intervals.

In step S21, the resource use amount collecting unit 11 of the physical server 10 collects information of a resource use amount for each VM 1 and transmits the collected information to the controller 20.

The data acquisition unit 21 of the controller 20 stores the acquired information of the resource use amount for each VM 1 in the data storage DB 26 (step S22). The processing after step S22 is performed for each VM 1.

Next, the performance value estimating unit 24 of the controller 20 calculates a performance estimation value x for each VM 1 by using learning result data stored in the learning functioning unit 23 on the basis of the resource use amount of the VMs 1 stored in the data storage DB 26 (step S23).

The priority changing determination unit 25 of the controller 20 determines to which region, among the insufficient performance region, the unchanged region, and the excessive performance region, the performance estimation value of the VM 1 calculated by the performance value estimating unit 24 belongs. Here, the performance estimation value x for the performance (latency) of the VM 1 (virtual router) is set to be an insufficient performance region (x>8 ms: first condition), an unchanged region (4 ms≤x≤8 ms), and an excessing performance region (x<4 ms: a second condition), and it is determined whether or not the performance estimation value of the VM 1 belongs to the insufficient performance region or whether or not the performance estimation value of the VM 1 belongs to the excessive performance region through the following processing. Specifically, the following processing is executed.

The priority changing determination unit 25 determines whether or not the performance estimation value x of the VM 1 satisfies x>8 ms (first condition) (step S24). In a case where the performance estimation value x satisfies the first condition (step S24→Yes), the priority changing determination unit 25 determines that the performance estimation value x is in the insufficient performance region. The priority changing determination unit 25 transmits an instruction for changing the priority group to a priority group of a CPU pinning pattern having a lower overcommit ratio (first priority group changing information) to the physical server 10 (step S25).

When the priority group changing unit 13 of the physical server 10 receives the priority group changing information, the priority group changing unit 13 confirms a priority group to which the VM 1 belongs with reference to the priority group setting information 14 and changes the priority group to a priority group of a CPU pinning pattern having a lower overcommit ratio (step S26). In this case, the priority group changing unit 13 updates the priority group setting information 14 on the basis of a priority group to which the VM 1 newly belongs.

On the other hand, in a case where the performance estimation value x does not satisfy the first condition in step S24 (step S24→No), the processing proceeds to step S27.

In step S27, the priority changing determination unit 25 determines whether or not the performance estimation value x of the VM 1 satisfies x<4 ms (second condition). In a case where the performance estimation value x satisfies the second condition (step S27→Yes), the priority changing determination unit 25 determines that the performance estimation value x is in the excessive performance region. The priority changing determination unit 25 transmits an instruction for changing the priority group to a priority group of a CPU pinning pattern having a higher overcommit ratio (second priority group changing information) to the physical server 10 (step S28).

When the priority group changing unit 13 of the physical server 10 receives the priority group changing information, the priority group changing unit 13 confirms a priority group to which the VM 1 belongs with reference to the priority group setting information 14 and changes the priority group to a priority group of a CPU pinning pattern having a higher overcommit ratio (step S29). In this case, the priority group changing unit 13 updates the priority group setting information 14 on the basis of a priority group to which the VM 1 newly belongs.

On the other hand, in a case where the performance estimation value x does not satisfy the second condition (step S27→No) in step S27, the processing is terminated. The priority changing determination unit 25 executes the processes of steps S24 to S29 for each VM 1 together with the physical server 10 (priority group changing unit 13).

As described above, according to the VM performance guarantee system S of the present embodiment, the VM 1 having a small load does not continue to secure excessive physical resources, and thus it is possible to improve the efficiency of utilization of resources of the physical server 10. In addition, priority groups having different numbers of VMs capable of sharing physical resources are defined, and a VM 1 dynamically switches the priority groups in the case of insufficient performance or excessive performance, so that it is possible to realize performance guarantee of the VMs 1 by efficiently utilizing physical resources.

Modification Example

The present disclosure is not limited to the embodiments described above, and changes can be made without departing from the spirit of the present disclosure. For example, the present disclosure can be implemented as the following modified example.

Modification Example 1

In the present embodiment, as described above, actual performance data often cannot be acquired while a service is actually provided, and thus the controller 20 is provided with the test tool functioning unit 22 (see FIG. 6), so that the load of the VMs 1 belonging to different priority groups are varied in a predetermined pattern to acquire test result information and a performance estimation value can be calculated.

On the other hand, in a case where the controller 20 can acquire (calculate) performance values in real time from a resource use amount for each VM 1 in accordance with the type of performance specified by SLA or the like, a system configuration, application setting, and the like, a configuration is provided with neither the test tool functioning unit 22, the learning functioning unit 23, nor the performance value estimating unit 24 (see FIG. 6). In this case, the priority changing determination unit 25 of the controller 20 executes priority group changing processing by determining insufficient performance and excessive performance of each VM using performance values acquired in real time.

Modification Example 2

Further, in the present embodiment, the controller 20 is provided with the test tool functioning unit 22 (see FIG. 6), and a test tool is started up to acquire test result information from the physical server 10. Instead of the learning functioning unit 23 generating learning result data using the test result information, the controller 20 may accumulate data of the resource use amount and performance values for each VM in the actual operation for a predetermined period of time (operation), and the learning functioning unit 23 may generate learning result data using the accumulated data (past actual data).

Similarly to the present embodiment, also in modification examples 1 and 2 of the present embodiment, it is possible to realize a performance guarantee of the VM 1 while improving the efficiency of utilization of physical resources.

REFERENCE SIGNS LIST

1 VM (virtual router)
10 Physical server (compute)
11 Resource use amount collecting unit
12 Priority group defining unit
13 Priority group changing unit
14 Priority group setting information
20 Controller
21 Data acquisition unit
22 Test tool functioning unit
23 Learning functioning unit
24 Performance value estimating unit
25 Priority changing determination unit
26 Data storage DB

The invention claimed is:

1. A VM performance guarantee system comprising:
a physical server configured to operate a plurality of virtual machines (VMs); and
a controller connected to the physical server and configured to manage an operation state of each VM,
wherein
the physical server comprises
a storage medium configured to
divide physical resources in the physical server into a plurality of groups, set a different number of VMs capable of sharing physical resources for each of the plurality of groups so that a priority group having a higher priority is set as the number of VMs capable of sharing physical resources decreases, and store priority group setting information containing a correspondence relationship between each of the priority groups and the VM operated on physical resources of the priority group, a resource use amount collecting unit, including one or more processors, configured to collect a resource use amount during operation of each of the plurality of VMs, and transmit the resource use amount collected to the controller, and a priority group changing unit, including one or more processors, configured to change a priority group to which a target VM belongs, with reference to priority group changing information when the priority group changing information indicating an instruction for changing the priority group with respect to each of the plurality of VMs is received from the controller, the controller comprises a data acquisition unit, including one or more processors, configured to acquire a resource use amount of each of the plurality of VMs from the physical server, and a priority changing determination unit, including one or more processors, configured to determine whether or not a performance value calculated based on the acquired resource use amount satisfies a first condition for determining insufficient performance of the target VM and determine whether or not the performance value satisfies a second condition for determining excessive performance of the target VM, transmit first priority group changing information indicating an instruction for performing change to a priority group having a higher priority to the physical server in a case where the performance value satisfies the first condition, and transmit second priority group changing information indicating an instruction for performing change to a priority group having a lower priority to the physical server in a case where the performance value satisfies the second condition, and the priority group changing unit of the physical server changes a priority group to which the target VM belongs to a priority group having a higher priority in a case where the first priority group changing information is received, and changes the priority group to which the target VM belongs to a priority group having a lower priority in a case where the second priority group changing information is received.

2. The VM performance guarantee system according to claim 1, wherein the controller further comprises a test tool functioning unit, including one or more processors, configured to instruct each of the plurality of VMs belonging to the priority groups to execute a test tool to be operated by varying a load in a predetermined pattern, a learning functioning unit, including one or more processors, configured to
receive a resource use amount and performance values obtained through the operation of the test tool as test result information from the physical server, and
generate learning result data to be used to estimate a performance value based on the resource use amount by machine learning based on the test result information, and
a performance value estimating unit, including one or more processors, configured to calculate a performance estimation value of each of the plurality of VMs using the learning result data based on a resource use amount of each of the plurality of VMs at a present time which is acquired from the physical server, and
the priority changing determination unit determines whether to change the priority group of each of the plurality of VMs by determining whether or not the first condition is satisfied or whether or not the second condition is satisfied, using the calculated performance estimation values.

3. The VM performance guarantee system according to claim 1,
wherein
the data acquisition unit of the controller acquires a resource use amount and performance values of each of the plurality of VMs belonging to the priority groups from the physical server as actual data in operation for a predetermined period of time,
the controller further comprises
a learning functioning unit, including one or more processors, configured to generate learning result data used to estimate a performance value based on the resource use amount by machine learning based on the actual data, and
a performance value estimating unit, including one or more processors, configured to calculate a performance estimation value of each of the plurality of VMs using the learning result data based on a resource use amount of each of the plurality of VMs at a present time which is acquired from the physical server, and
the priority changing determination unit determines whether to change the priority group of each of the plurality of VMs by determining whether or not the first condition is satisfied or whether or not the second condition is satisfied, using the calculated performance estimation values.

4. A VM performance guarantee method comprising:
collecting, by a physical server configured to operate a plurality of VMs, a resource use amount during operation of each of the VMs, and transmitting, by the physical server, the resource use amount collected to a controller, wherein the physical server comprising a storage medium configured to divide physical resources in the physical server into a plurality of groups, set a different number of VMs capable of sharing physical resources for each of the plurality of groups so that a priority group having a higher priority is set as the number of VMs capable of sharing physical resources decreases, and store priority group setting information containing a correspondence relationship between each of the priority groups and the VM operated on physical resources of the priority group;
acquiring, by the controller connected to the physical server and configured to manage an operation state of each VM, a resource use amount of each of the VMs from the physical server, determining, by the controller, whether or not a performance value calculated based on the acquired resource use amount satisfies a first condition for determining insufficient performance of a target VM, determining, by the controller, whether or not the performance value satisfies a second condition for determining excessive performance of the target VM, transmitting, by the controller, first priority group changing information indicating an instruction for performing change to a priority group having a higher priority to the physical server in a case where the performance value satisfies the first condition, and transmitting, by the controller, second priority group changing information indicating an instruction for performing change to a priority group having a lower priority to the physical server in a case where the performance value satisfies the second condition; and
changing, by the physical server, the priority group to which the target VM belongs to a priority group having a higher priority with reference to the priority group setting information in a case where the first priority group changing information is received, and changing, by the physical server, the priority group to which the target VM belongs to a priority group having a lower priority with reference to the priority group setting information in a case where the second priority group changing information is received.

5. The VM performance guarantee method according to claim 4, further comprising:
instructing, by the controller, each of the plurality of VMs belonging to the priority groups to execute a test tool to be operated by varying a load in a predetermined pattern;
receiving, by the controller, a resource use amount and performance values obtained through the operation of the test tool as test result information from the physical server;
generating, by the controller, learning result data to be used to estimate a performance value based on the resource use amount by machine learning based on the test result information;
calculating, by the controller, a performance estimation value of each of the plurality of VMs using the learning result data based on a resource use amount of each of the plurality of VMs at a present time which is acquired from the physical server; and
determining, by the controller, whether to change the priority group of each of the plurality of VMs by determining whether or not the first condition is satisfied or whether or not the second condition is satisfied, using the calculated performance estimation values.

6. The VM performance guarantee method according to claim 4, further comprising:
acquiring, by the controller, a resource use amount and performance values of each of the plurality of VMs belonging to the priority groups from the physical server as actual data in operation for a predetermined period of time;
generating, by the controller, learning result data used to estimate a performance value based on the resource use amount by machine learning based on the actual data;
calculating, by the controller, a performance estimation value of each of the plurality of VMs using the learning result data based on a resource use amount of each of the plurality of VMs at a present time which is acquired from the physical server; and determining, by the controller, whether to change the priority group of each of the plurality of VMs by determining whether or not the first condition is satisfied or whether or not the second condition is satisfied, using the calculated performance estimation values.

\* \* \* \* \*